(12) United States Patent
Autry et al.

(10) Patent No.: US 12,528,145 B2
(45) Date of Patent: Jan. 20, 2026

(54) METHODS AND APPARATUSES FOR DECOUPLING A FUSELAGE FROM A MANDREL

(71) Applicant: The Boeing Comapny, Arlington, VA (US)

(72) Inventors: Byron James Autry, Charleston, SC (US); David Raines, Huntsville, AL (US); Scott Smotherman, Huntsville, AL (US); David M. Petka, Huntsville, AL (US)

(73) Assignee: The Boeing Company, Arlington, VA (US)

( * ) Notice: Subject to any disclaimer, the term of this patent is extended or adjusted under 35 U.S.C. 154(b) by 31 days.

(21) Appl. No.: 18/436,732

(22) Filed: Feb. 8, 2024

(65) Prior Publication Data
US 2024/0181583 A1 Jun. 6, 2024

Related U.S. Application Data

(62) Division of application No. 17/548,704, filed on Dec. 13, 2021, now Pat. No. 11,931,845.
(Continued)

(51) Int. Cl.
*B64F 5/10* (2017.01)
*B23Q 3/12* (2006.01)
*B64C 1/06* (2006.01)

(52) U.S. Cl.
CPC .............. *B23Q 3/12* (2013.01); *B64F 5/10* (2017.01); *B64C 1/068* (2013.01)

(58) Field of Classification Search
CPC .... B23Q 3/12; B64F 5/10; B64C 1/068; B25J 15/0052; B25J 15/0616
See application file for complete search history.

(56) References Cited

U.S. PATENT DOCUMENTS

| 5,430,937 A | 7/1995 | Leahy et al. |
| 2006/0118245 A1 | 6/2006 | Imazeki |

(Continued)

FOREIGN PATENT DOCUMENTS

| EP | 3 552 773 A1 | 10/2019 |
| FR | 2 788 743 A1 | 7/2000 |

OTHER PUBLICATIONS

Extended European Search Report prepared by the European Patent Office in application No. EP 21 21 1938.2 dated May 9, 2022.

*Primary Examiner* — Jun S Yoo
(74) *Attorney, Agent, or Firm* — Walters & Wasylyna LLC

(57) ABSTRACT

In an example, a system is disclosed. The system comprises a one-piece mandrel, a fuselage coupled to the one-piece mandrel, and a strongback apparatus positioned on the fuselage. The strongback apparatus comprises an arcuate central body comprising a front end, a rear end, and a plurality of elongated members that connect the front end to the rear end, and actuators mounted to the plurality of elongated members. The actuators are configured to move in a radially outward direction from extended positions to retracted positions and comprise (i) proximal ends mounted to the plurality of elongated members and (ii) distal ends having vacuum suction cups. In the extended positions, the vacuum suction cups engage the fuselage on which the strongback apparatus is positioned. As the actuators moves from the extended positions to the retracted positions, the vacuum suction cups pull the fuselage away from the one-piece mandrel.

20 Claims, 17 Drawing Sheets

Related U.S. Application Data

(60) Provisional application No. 63/125,124, filed on Dec. 14, 2020.

(56) References Cited

U.S. PATENT DOCUMENTS

| | | |
|---|---|---|
| 2010/0175816 A1 | 7/2010 | Sauvestre et al. |
| 2016/0074926 A1 | 3/2016 | Hunt et al. |
| 2016/0075451 A1* | 3/2016 | Hunt ................. G01B 11/2518 72/16.2 |
| 2019/0317482 A1* | 10/2019 | Stone ................. G05B 19/4189 |

* cited by examiner

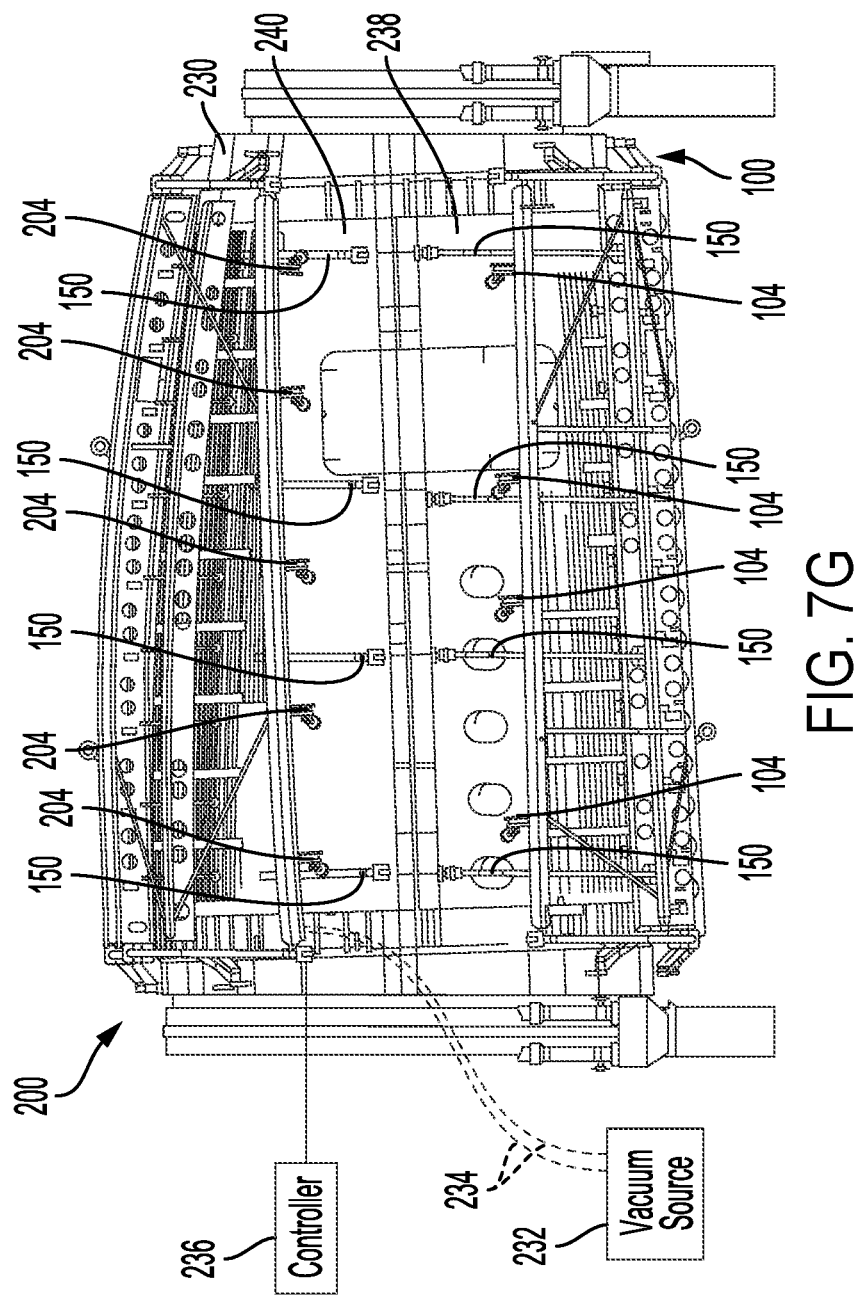

METHODS AND APPARATUSES FOR DECOUPLING A FUSELAGE FROM A MANDREL

CROSS-REFERENCE TO RELATED APPLICATIONS

The present disclosure claims is a continuation of U.S. patent application Ser. No. 17/548,704, filed on Dec. 13, 2021, which claims priority to U.S. Provisional Application No. 63/125,124, filed on Dec. 14, 2020, the entire contents of all are herein incorporated by reference.

FIELD

The present disclosure relates generally to strongback apparatuses, and more particularly, to strongback apparatuses and methods for using strongback apparatuses to decouple a fuselage from a mandrel.

BACKGROUND

Existing processes for decoupling caul plates from a fuselage of an aircraft or for decoupling the fuselage from a mandrel typically utilize a segmented mandrel. That is, existing mandrels are typically fabricated in multiple arc segments which are then sealed and assembled together. To decouple the fuselage from such a mandrel, the mandrel is disassembled or collapsed (e.g., taken apart at the seals) and removed from the fuselage with the fuselage remaining intact. The mandrel is then expanded or reassembled for future use.

However, these existing mandrels and these existing processes can add more cost, complexity, and labor than desired, since specialized equipment is typically required to support the disassembly or collapsing of the mandrel and to manipulate each segment of the mandrel.

Thus, mechanisms are needed for reducing the cost, complexity, and labor required for decoupling caul plates from a fuselage of an aircraft or for decoupling a fuselage from a mandrel.

SUMMARY

In an example, a method is described. The method comprises positioning a strongback apparatus on a first tubular structure, where the first tubular structure is coupled to a second tubular structure. The strongback apparatus comprises an arcuate central body comprising a front end, a rear end, and a plurality of elongated members that connect the front end to the rear end, and a plurality of actuators pivotably mounted to the plurality of elongated members, where the plurality of actuators are configured to move in a radially outward direction and comprise (i) proximal ends pivotably mounted to the plurality of elongated members and (ii) distal ends having vacuum suction cups. The method also comprises operating a vacuum source to engage the vacuum suction cups of the plurality of actuators with the first tubular structure. The method also comprises while the vacuum suction cups of the plurality of actuators are engaged with the first tubular structure, controlling the plurality of actuators to pull the first tubular structure away from the second tubular structure in the radially outward direction. The method also comprises while pulling the first tubular structure away from the second tubular structure in the radially outward direction, decoupling, with the strongback apparatus, the first tubular structure from the second tubular structure.

In another example, a strongback apparatus is described. The strongback apparatus comprises an arcuate central body comprising a front end, a rear end, and a plurality of elongated members that connect the front end to the rear end. The strongback apparatus also comprises a plurality of actuators pivotably mounted to the plurality of elongated members. The plurality of actuators are configured to move in a radially outward direction and comprise (i) proximal ends pivotably mounted to the plurality of elongated members and (ii) distal ends having vacuum suction cups.

In another example, a system is disclosed. The system comprises a one-piece mandrel, a fuselage coupled to the one-piece mandrel, and a strongback apparatus positioned on the fuselage. The strongback apparatus comprises an arcuate central body comprising a front end, a rear end, and a plurality of elongated members that connect the front end to the rear end, and actuators mounted to the plurality of elongated members. The actuators are configured to move in a radially outward direction from extended positions to retracted positions and comprise (i) proximal ends mounted to the plurality of elongated members and (ii) distal ends having vacuum suction cups. In the extended positions, the vacuum suction cups engage the fuselage on which the strongback apparatus is positioned. As the actuators moves from the extended positions to the retracted positions, the vacuum suction cups pull the fuselage away from the one-piece mandrel.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIGS. 7A-7H illustrate side views of example stages of a process for bisecting a first tubular structure that is coupled to a second tubular structure, followed by a process for decoupling the first tubular structure from the second tubular structure, according to an example implementation.

DETAILED DESCRIPTION

Figure 1:
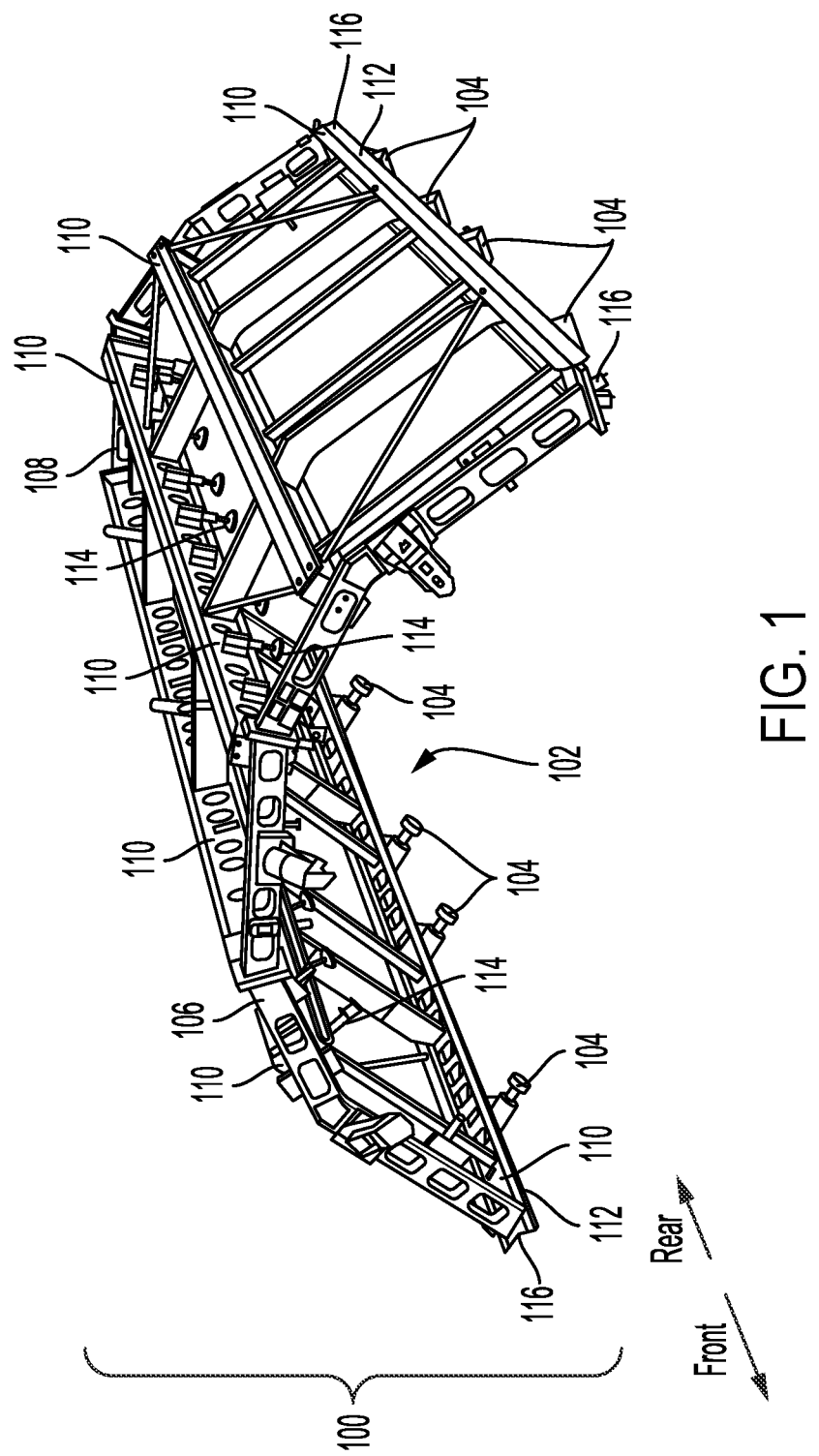
FIG. 1 depicts a perspective view of an example of a strongback apparatus, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the terms "substantially," "about," "approximately," and "proximate" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise specifically noted, elements depicted in the drawings are not necessarily drawn to scale.

Within examples, described herein is an improved strongback apparatus that can be used for decoupling a first tubular structure from a second tubular structure. Although examples described herein will primarily involve the first tubular structure and second tubular structure taking the forms of a fuselage and mandrel, respectively, it should be understood that the disclosed strongback apparatus can be used for processes in which the first tubular structure and second tubular structure take the forms of a caul plate (or plates) and a fuselage, respectively.

The disclosed strongback apparatus includes, in part, actuators (e.g., pneumatic actuators) that engage, via a vacuum, to the fuselage and spread the fuselage (e.g., sections of a bisected fuselage) apart from the mandrel, so that the fuselage can be more easily lifted off the fuselage. The disclosed strongback apparatus also includes spreader arms that are removably attached to the strongback apparatus and used, along with corresponding winch straps, to further secure the fuselage and to spread the fuselage farther, thus providing additional help when decoupling the fuselage from the mandrel.

The disclosed strongback apparatus also advantageously allows for a one-piece mandrel to be used during processes for removing caul plates, trimming/bisecting a fuselage, and decoupling the fuselage from the one-piece mandrel. Such a one-piece mandrel is not segmented or fabricated in the same manner as existing mandrels. Rather, using the strongback apparatuses described herein, the fuselage is bisected and removed from the one-piece mandrel and the one-piece mandrel is left intact, thus decreasing complexity and allowing for the process to be completed more efficiently.

These and other improvements are described in more detail below. Implementations described below are for purposes of example. The implementations described below, as well as other implementations, may provide other improvements as well.

Referring now to the figures, FIG. 1 depicts a perspective view of an example of a strongback apparatus 100. The strongback apparatus 100 includes an arcuate central body 102 and a plurality of actuators 104.

The arcuate central body 102 has a front end 106, a rear end 108, and a plurality of elongated members 110 that connect the front end 106 to the rear end 108. Arrows labeled "Front" and "Rear" are shown, and correspond to the orientation of front and rear ends of a fuselage (not shown) and mandrel (not shown) with which the strongback apparatus 100 interacts. Within examples, the arcuate central body 102 and the plurality of elongated members 110 are made of metal, although other materials are possible as well.

The plurality of actuators 104 are configured to move from an extended position to a retracted position in a radially outward direction, and from the retracted position back to the extended position. Within examples, the plurality of actuators 104 are pneumatic, linear actuators. Within other examples, the plurality of actuators 104 include at least one other type of actuator, such as an electromechanical actuator.

In some examples, such as the example shown in FIG. 1, the plurality of elongated members 110 includes a pair of peripheral elongated members 112 that define longitudinal edges of the arcuate central body 102, and the plurality of actuators 104 are pivotably mounted to the pair of peripheral elongated members 112.

As further shown, the strongback apparatus 100 includes a plurality of vacuum cups 114 fixedly mounted to the plurality of elongated members 110. In particular, in the example shown in FIG. 1, the plurality of vacuum cups 114 are fixedly mounted to all of the elongated members to the plurality of elongated members 110 except the pair of peripheral elongated members 112. To facilitate this, for example, each of the plurality of vacuum cups 114 can be fixedly mounted to a respective bracket, which is in turn fixedly mounted to one of the plurality of elongated members 110 other than the pair of peripheral elongated members 112. The reference number for the plurality of vacuum cups 114 designates three representative examples of such vacuum cups, although others are shown as well, particularly along some of the elongated members of the plurality of elongated members 110 other than the pair of peripheral elongated members 112. Within examples, the plurality of vacuum cups 114 can include thirty-six vacuum cups, although more or less are possible.

The plurality of vacuum cups 114 can help grip and remove caul plates (not shown) from a fuselage and can help bisect and demold a fuselage from a mandrel. To facilitate this, the strongback apparatus 100 can include a plurality of ports 116 (e.g., four ports, with one on each corner of the strongback apparatus 100) and tubes (not shown) that couple the plurality of actuators 104 and the plurality of vacuum cups 114 to a vacuum source (not shown in FIG. 1, but shown in later figures) configured to promote vacuum suction between the plurality of actuators 104 and the plurality of vacuum cups 114 and a surface, such as a surface of a fuselage or a caul plate. The plurality of ports 116 can all be plumed as a closed system to provide vacuum to the plurality of actuators 104 and the plurality of vacuum cups 114 via the tubes. In some examples, each port can be part of a utility manifold that includes one air fitting, one vacuum fitting, one vacuum gauge, and a vacuum vent valve. To release a caul plate or the fuselage, the vacuum vent valve can be opened, thus disengaging the vacuum.

As noted above, the plurality of actuators 104 are pivotably mounted to the plurality of elongated members 110. To facilitate this, the strongback apparatus 100 includes a plurality of brackets fastened to the plurality of elongated members 110 (e.g., the pair of peripheral elongated members 112), and the plurality of actuators 104 are pivotably mounted to the plurality of brackets.

Figure 2:
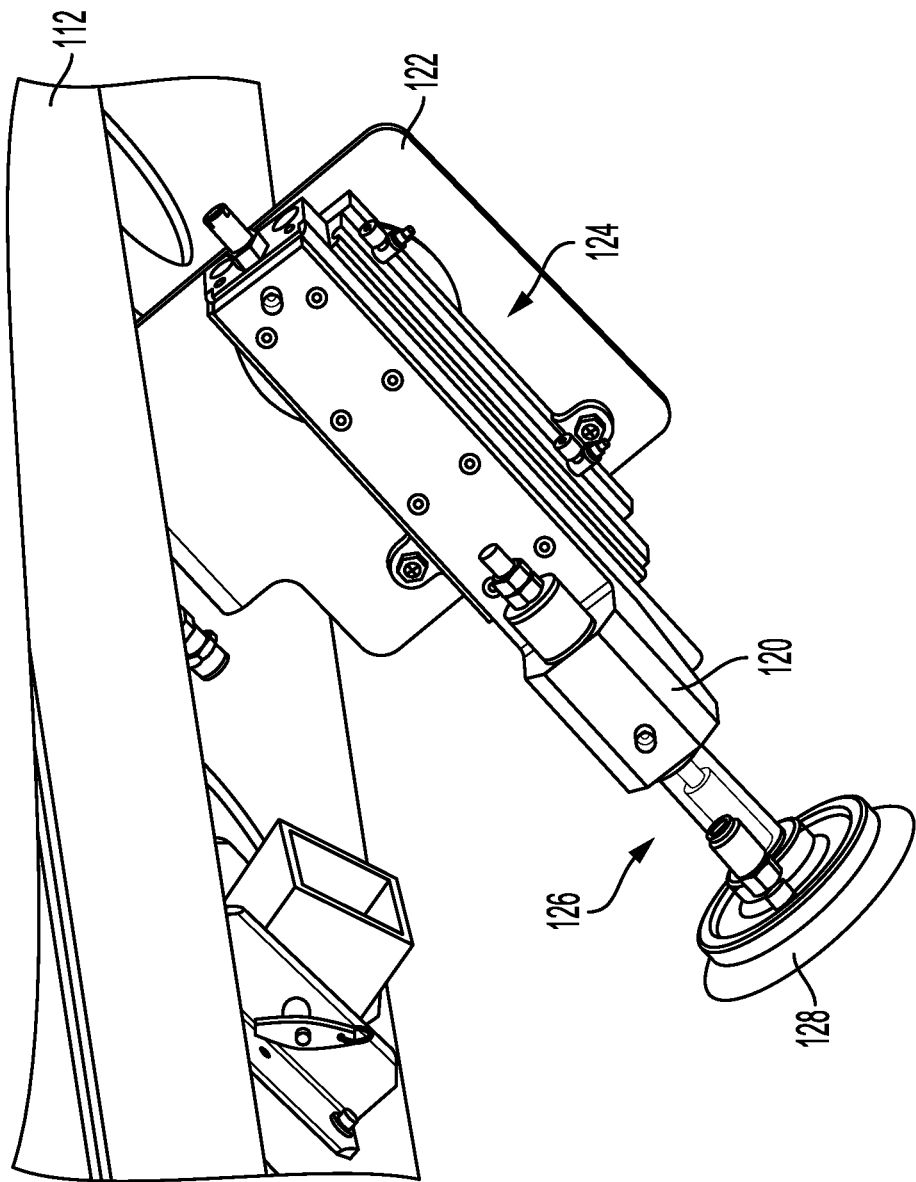
FIG. 2 depicts a perspective view of an actuator of the strongback apparatus of FIG. 1, according to an example implementation.

FIG. 2 depicts a perspective view of an actuator 120 of the plurality of actuators 104, which is pivotably mounted to a bracket 122. Actuator 120 (and all components thereof shown in FIG. 2 and FIG. 3) is treated herein as a representative example of the plurality of actuators 104. Bracket 122 is treated as a representative example of the plurality of brackets that are fastened to the plurality of elongated members 110. In particular, FIG. 2 shows bracket 122 fastened to (e.g., via one or more screws, bolts, or other fasteners) one of the pair of peripheral elongated members 112.

As shown, actuator 120 includes a proximal end 124 pivotably mounted to bracket 122, and thus pivotably mounted to the one of the pair of peripheral elongated members 112 by way of bracket 122. Actuator 120 also includes a distal end 126 having a vacuum suction cup 128. The vacuum suction cup 128 is configured to be coupled to a vacuum source (not shown).

Figure 3:
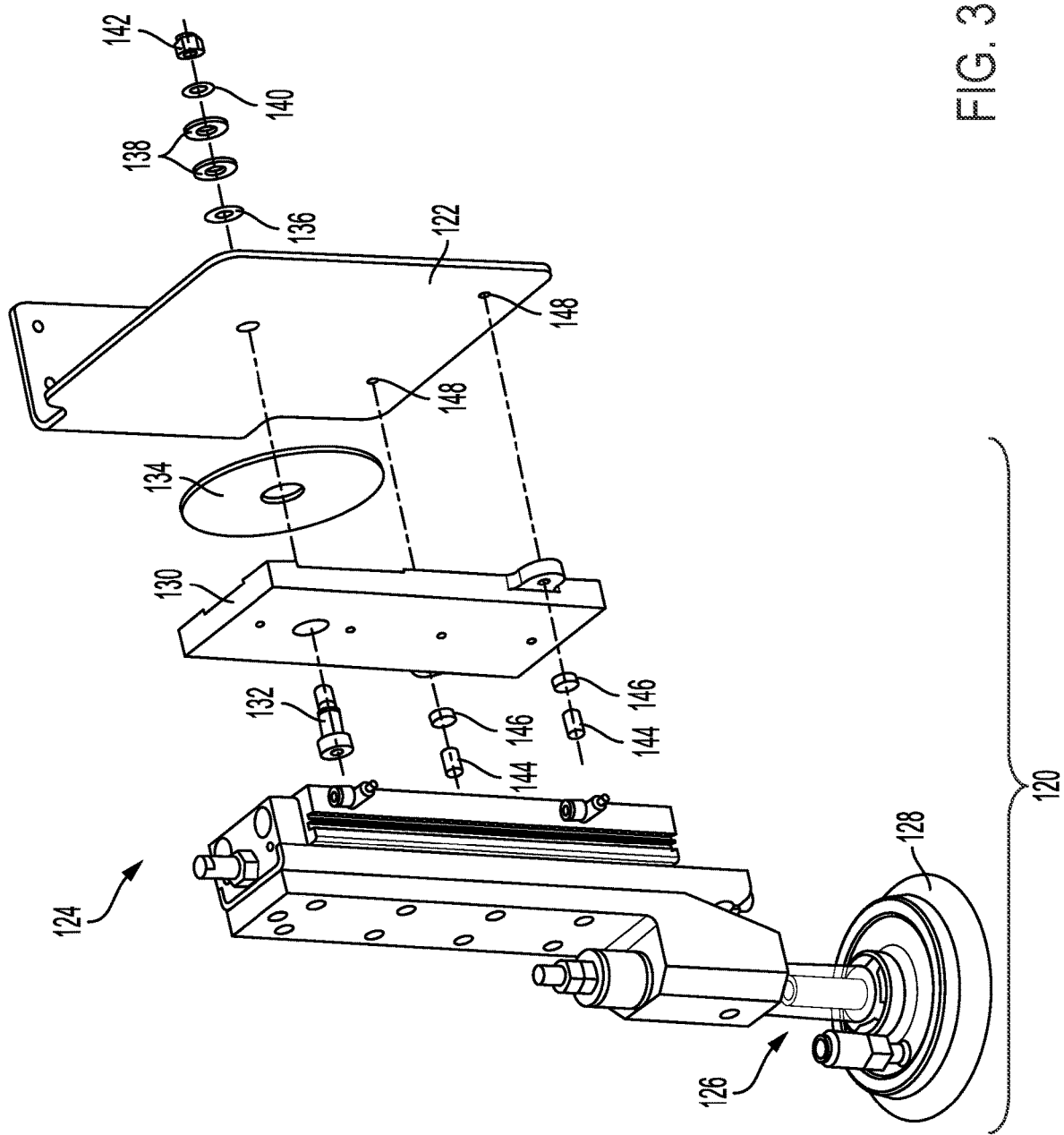
FIG. 3 depicts an exploded view of an example assembly for pivotably mounting the actuator of FIG. 2 to a bracket, according to an example implementation.

FIG. 3 depicts an exploded view of an example assembly for pivotably mounting actuator 120 to bracket 122. As shown, actuator 120 is attached to an actuator plate 130, which is in turn pivotably mounted to bracket 122 by disposing a shoulder screw 132 through a hole in a thrust washer 134 positioned between the actuator plate 130 and then through a hole in bracket 122. A thrust bearing 136, two Belleville washers 138, a plain washer 140, and a lock nut 142 are then attached to the end of the shoulder screw 132. In alternative examples, other components can be used to mount actuator 120, such as a pivot pin instead of the shoulder screw.

As further shown, the proximal end 124 of actuator 120 includes detent pins 144. The detent pins 144 are coupled to the actuator plate 130 via jam nuts 146 and protrude through opposing ears that protrude from sides of the actuator plate 130. Bracket 122 thus includes detent holes 148 configured for receiving the detent pins 144. In alternative examples, more or less detent pins and/or detent holes are possible than those shown in FIG. 3.

As discussed above, the plurality of actuators 104 can be configured to spread open a caul plate for installation or removal from a fuselage, or to spread open a fuselage for removal from a mandrel. To facilitate this, each of the plurality of actuators 104 is configured to move from an extended position to a retracted position in a radially outward direction to spread the caul plate or fuselage, and then can be kept back in the extended position when not in use.

In operation, the detent pins 144 and the detent holes 148 are used to set actuator 120 orientation at a "home" position before actuator 120 interfaces with a caul plate or fuselage. To do this, the angle of the actuator 120 can be adjusted until the detent pins 144 (i.e., both detent pins) are locked into the detent holes 148.

After actuator 120 is extended to the extended position and the vacuum suction cup 128 interfaces with the caul plate or fuselage, actuator 120 can then rotate/swivel about the shoulder screw 132 as actuator 120 moves to the retracted position, thereby spreading the fuselage and pulling the fuselage away from the mandrel (or thereby spreading the caul plate and pulling the caul plate away from the fuselage). This rotation/swivel can be helpful for keeping the vacuum suction cup 128 in intimate contact with the caul plate or fuselage during the movement in the radially outward direction from the extended position to the retracted position. Otherwise, shear force between the vacuum suction cup 128 and the surface of the caul plate or fuselage can overcome the vacuum force and detach the caul plate or fuselage, due to the spreading of the caul plate or fuselage open in an arc-like shape.

As discussed above, the strongback apparatus 100 can include additional components to further assist with the processes described herein.

Figure 4:
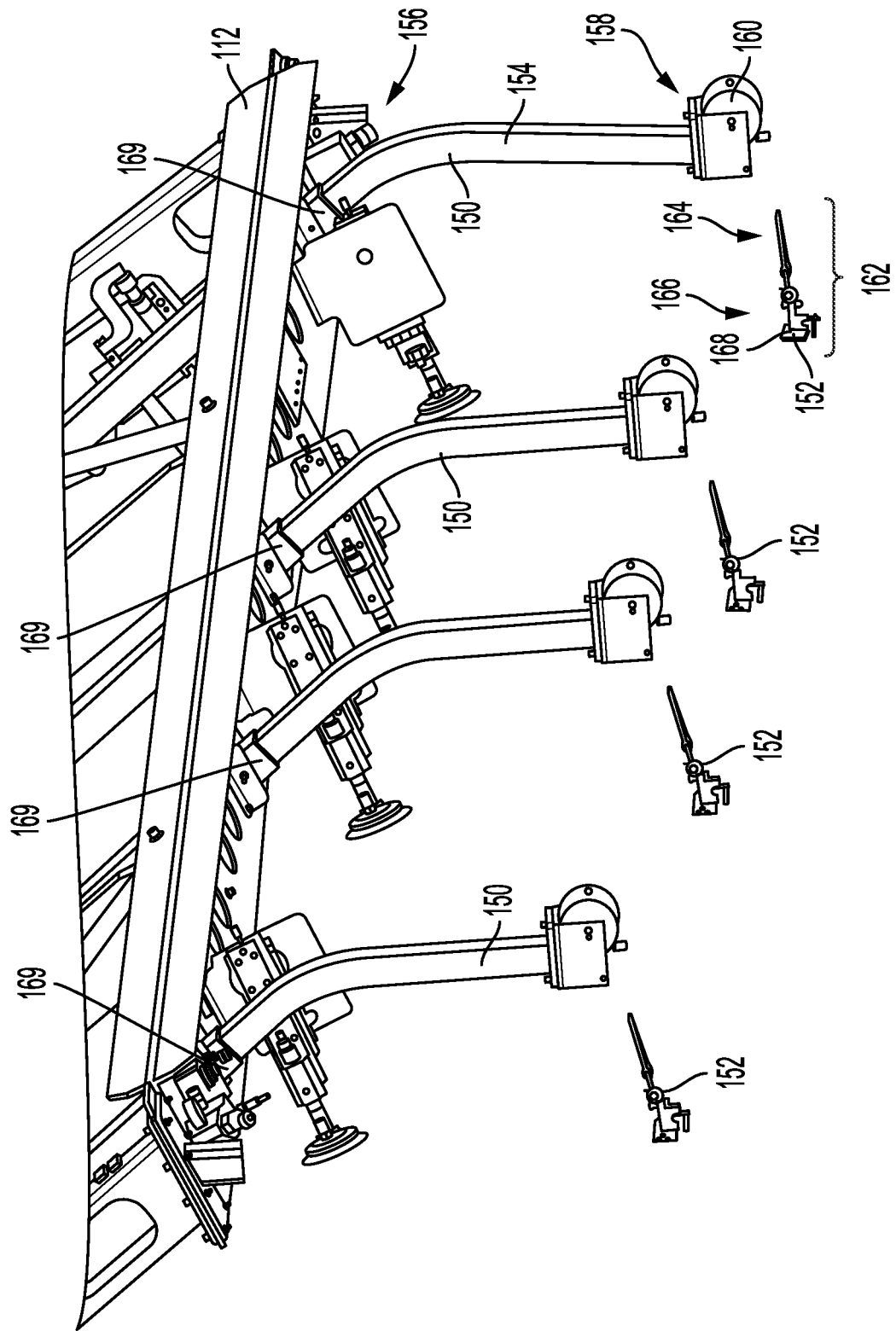
FIG. 4 depicts a perspective view of a plurality of spreader arms, according to an example implementation.

FIG. 4 depicts a perspective view of a plurality of spreader arms 150 that are removably attached to the pair of peripheral elongated members 112. The plurality of spreader arms 150 are removable so that they are not in the way when trimming/bisecting a caul plate or fuselage and can be attached after such processes are complete.

Although only one of the pair of peripheral elongated members 112 is shown in FIG. 4, the plurality of spreader arms 150 also includes spreader arms removably attached to the other of the pair of peripheral elongated members 112. The strongback apparatus 100 also includes a plurality of winch straps 152, each corresponding to a respective one of the plurality of spreader arms 150. As shown, the plurality of spreader arms 150 are each bent, so as to substantially mimic an arcuate shape of a fuselage. Within examples, the strongback apparatus 100 includes eight spreader arms, four of which are shown in FIG. 4.

FIG. 4 designates spreader arm 154 as representative example of the plurality of spreader arms 150. Spreader arm 154 includes a proximal end 156 and a distal end 158. The proximal end 156 is removably attached to the pair of peripheral elongated members 112. The distal end 158 includes a winch 160 that is rigidly attached to the remainder of spreader arm 154. The winch 160 can be a manual winch, such as a worm drive hand winch, or can be another type of manual or electrically-operated winch.

FIG. 4 also designates winch strap 162 as representative example of the plurality of winch straps 152, which corresponds to spreader arm 154. Winch strap 162 includes a first end 164 that is attachable to the winch 160 of spreader arm 154, and also includes a second end 166 having a clip 168.

To removably attach the plurality of spreader arms 150 to the pair of peripheral elongated members 112, the pair of peripheral elongated members 112 include a plurality of receiver slots 169 configured for receiving the plurality of spreader arms 150. For example, proximal ends of the plurality of spreader arms 150 (e.g., proximal end 156) can be inserted into to the plurality of receiver slots 169 and quick-release pins, bolts, or other fasteners can be inserted through holes in both the plurality of receiver slots 169 and the proximal ends of the plurality of spreader arms 150.

Figure 5:
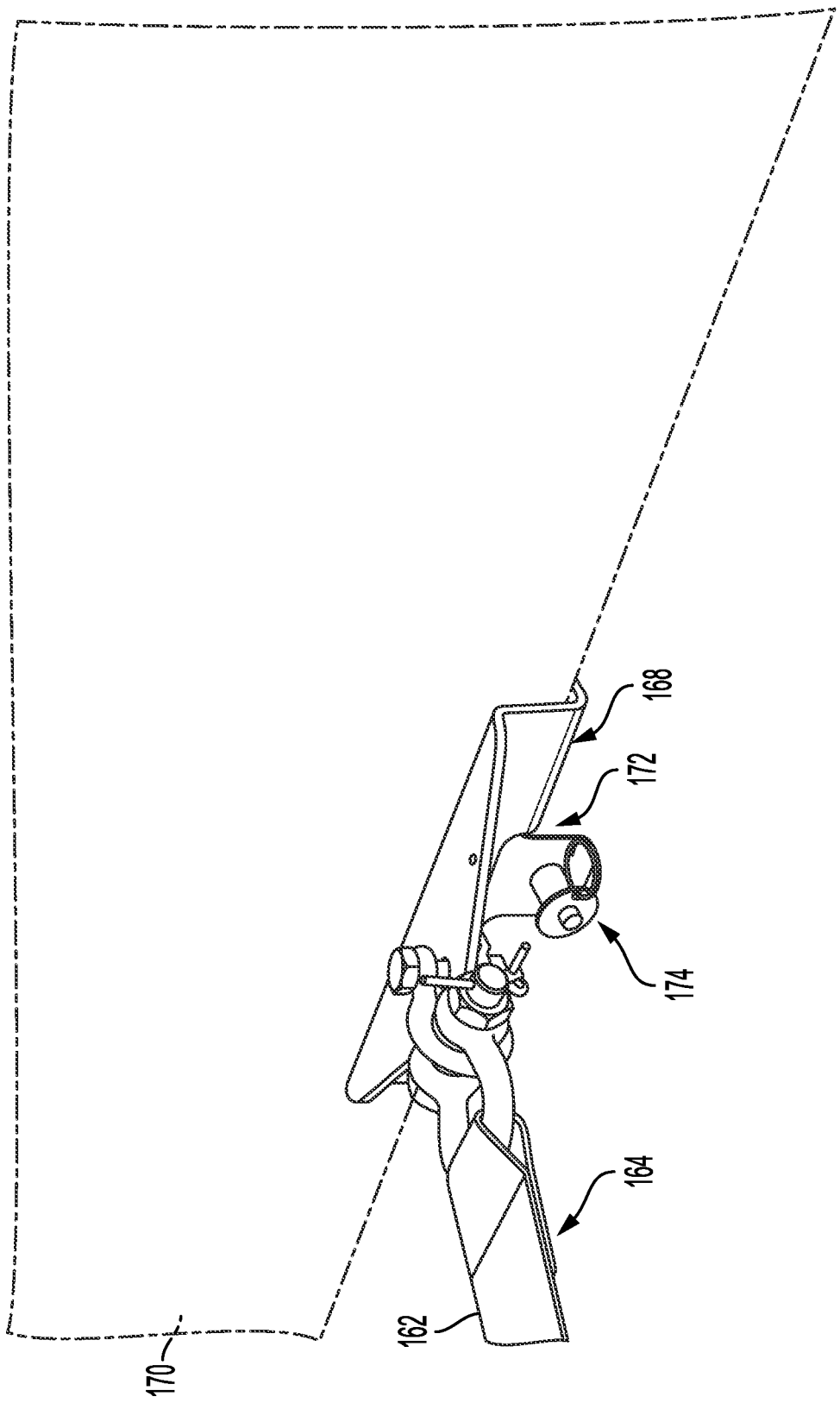
FIG. 5 depicts a perspective view of an example of how to attach a winch strap between a spreader arm and a fuselage, according to an example implementation.

FIG. 5 depicts a perspective view of an example of how the clip 168 can be attached to a fuselage 170. As shown, the fuselage 170 has a tooling tab 172. To attach the clip 168 to the fuselage 170, the tooling tab 172 can be disposed through a hole in the clip 168. A quick-release pin 174 can then be inserted through a hole in the tooling tab 172 to secure the clip 168. The clip 168 is shaped to contact an underside and side of the fuselage 170 during operation (e.g., during the spreading and lifting of the fuselage 170).

Figure 6:
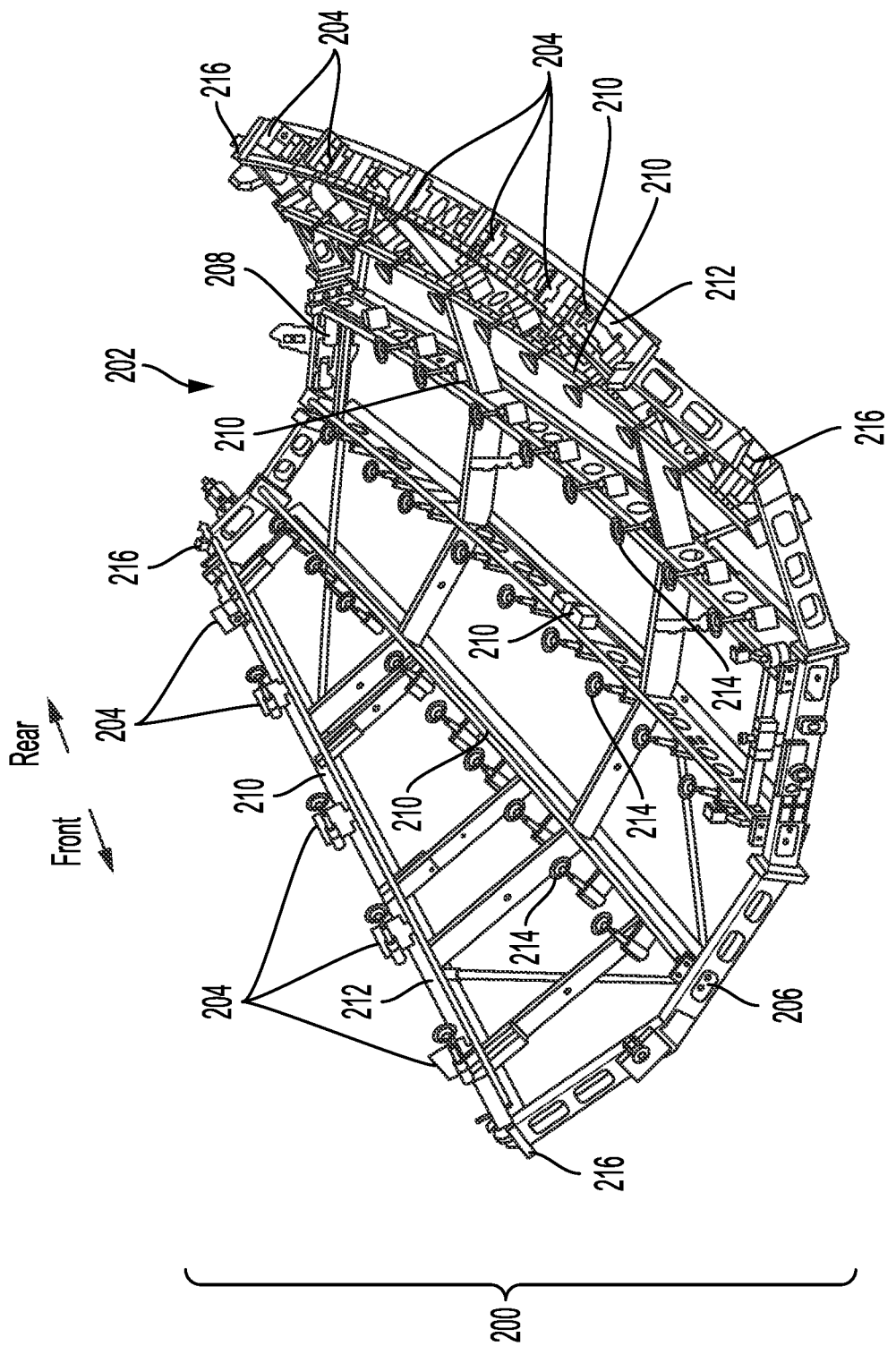
FIG. 6 depicts a perspective view of an example of a second strongback apparatus, according to an example implementation.

FIG. 6 depicts a perspective view of an example of a second strongback apparatus 200. The second strongback apparatus 200 includes a second arcuate central body 202 and a second plurality of actuators 204.

The second arcuate central body 202 has a second front end 206, a second rear end 208, and a second plurality of elongated members 210 that connect the second front end 206 to the second rear end 208.

The second plurality of actuators 204 are configured to move from an extended position to a retracted position in a radially outward direction, and from the retracted position back to the extended position. Although not explicitly denoted in FIG. 6, the second plurality of actuators 204 include second proximal ends pivotably mounted to the second plurality of elongated members 210, and also include second distal ends having second vacuum suction cups. As an example, each of the second plurality of actuators 204 can take the same form as, or a similar form as, actuator 120 shown in FIGS. 2 and 3.

The second plurality of elongated members 210 includes a second pair of peripheral elongated members 212 that define longitudinal edges of the second arcuate central body 202, and the second plurality of actuators 204 are pivotably mounted to the second pair of peripheral elongated members 212.

As further shown, the second strongback apparatus 200 includes a second plurality of vacuum cups 214 fixedly mounted to the second plurality of elongated members 210. In particular, in the example shown in FIG. 6, the second plurality of vacuum cups 214 are fixedly mounted to all of the elongated members to the second plurality of elongated members 210 except the second pair of peripheral elongated members 212. To facilitate this, for example, each of the second plurality of vacuum cups 214 can be fixedly mounted to a respective bracket, which is in turn fixedly mounted to one of the second plurality of elongated members 210 other than the second pair of peripheral elongated members 212. The reference number for the second plurality of vacuum cups 214 designates three representative examples of such vacuum cups, although others are shown as well, particularly along some of the elongated members of the second plurality of elongated members 210 other than the second pair of peripheral elongated members 212. Within examples, the second plurality of vacuum cups 214 can include thirty-six vacuum cups, although more or less are possible.

The second plurality of vacuum cups 214 can help grip and remove caul plates (not shown) from a fuselage and can help bisect and demold a fuselage from a mandrel. To facilitate this, the second strongback apparatus 200 can include a second plurality of ports 216 (e.g., four ports, with one on each corner of the second strongback apparatus 200) and tubes (not shown) that couple the second plurality of actuators 204 and the second plurality of vacuum cups 214 to a vacuum source (not shown in FIG. 6, but shown in later figures) configured to promote vacuum suction between the second plurality of actuators 204 and the second plurality of vacuum cups 214 and a surface, such as a surface of a fuselage or a caul plate. The second plurality of ports 216 can all be plumed as a closed system to provide vacuum to the second plurality of actuators 204 and the second plurality of vacuum cups 214 via the tubes.

In some examples, the second strongback apparatus 200 can have more or less elongated members, actuators, and/or fixedly-mounted vacuum cups than those shown in FIG. 6, and might have more or less of such components compared with the strongback apparatus 100. For example, the strongback apparatus 100 shown in FIG. 1 includes eight actuators and the second strongback apparatus 200 includes ten actuators.

FIGS. 7A-7H illustrate side views of example stages of a process for bisecting a first tubular structure 220 that is coupled to a second tubular structure 230, followed by a process for decoupling the first tubular structure 220 from the second tubular structure 230. In the examples shown in FIG. 7A-7H, the first tubular structure 220 is a fuselage and the second tubular structure 230 is a one-piece mandrel. The fuselage can be a composite fuselage, or, in alternative examples, the fuselage could be made of other materials.

As discussed above, existing mandrels are typically segmented—that is, they are fabricated in multiple arc segments which are then sealed and assembled together. As further discussed above, existing processes for decoupling a fuselage that utilize such a mandrel involved taking the mandrel apart at the seals and removing it from the fuselage, with the fuselage remaining intact, after which the mandrel would then need to be reassembled for future use. By contrast, the process illustrated by FIGS. 7A-7H advantageously allows for use of a one-piece mandrel that is not segmented and fabricated in the manner noted above. With this process, the fuselage is bisected and removed from the one-piece mandrel and the one-piece mandrel is left intact, thus decreasing complexity and allowing for the process to be completed more efficiently.

It should be understood that, although FIGS. 7A-7H are described with respect to bisecting and decoupling a fuselage, at least a portion of the operates described below can be used or modified for use in scenarios where the first tubular structure 220 comprises one or more caul plates and the second tubular structure 230 is a fuselage. As an example, the strongback apparatus 100 (and perhaps additionally the second strongback apparatus 200) can be positioned on a caul plate or caul plates that is/are coupled to the fuselage, which is in turn coupled to a mandrel. The strongback apparatus 100 (and perhaps additionally the second strongback apparatus 200) can then be used in manner similar to that described below to spread the caul plate(s) and decouple the caul plate(s) from the fuselage. Further, the strongback apparatus(es) could also be used to load the caul plate(s) on the fuselage in the first place, and then remove the caul plate(s) once the caul plate(s) is/are cured. In alternative examples, the first tubular structure 220 and the second tubular structure 230 can be other types of tubular structures.

Although the stages and operations described below are described as occurring in a particular order, such stages and/or operations performed as part of such stages can occur in other orders.

Figure 7A:
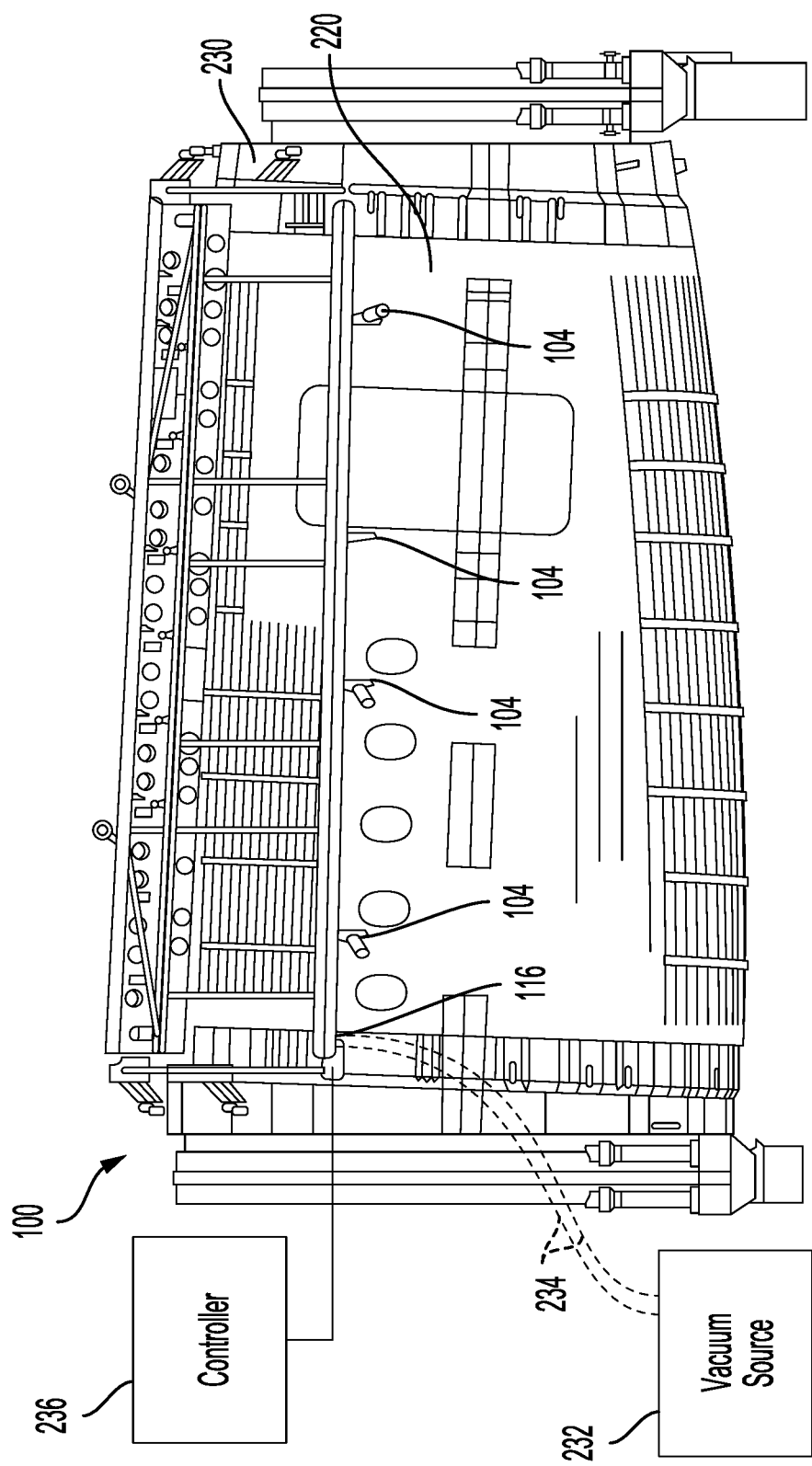

FIG. 7A illustrates an initial stage in the process in which the strongback apparatus 100 is positioned on the first tubular structure 220. For example, an overhead crane (not shown) is used to lower the strongback apparatus 100 on the first tubular structure 220. The strongback apparatus 100 can also be attached (e.g., hook-latched) onto the second tubular structure 230 to further secure the strongback apparatus 100 in place until it is time to decouple the first tubular structure 220.

A vacuum source 232 is then operated to engage the plurality of vacuum cups 114 (not explicitly denoted in FIGS. 7A-7H) with the first tubular structure 220. To facilitate this, air and vacuum hoses 234 are connected between the vacuum source 232 and one or more of the plurality of ports 116 of the strongback apparatus 100. In some examples, 100-110 psi of compressed air can be supplied via the air and vacuum hoses 234 and approximately 24 in-Hg of vacuum can be used to engage the plurality of vacuum cups 114 with the first tubular structure 220.

In addition, a controller 236 can be connected to the strongback apparatus 100, such as by plugging a cable extending from the controller 236 into a socket in the strongback apparatus 100. Connecting the controller 236 to the strongback apparatus 100 electrically couples the controller 236 to the plurality of actuators 104 and thus allows the controller 236 to be used to manipulate (e.g., move) the plurality of actuators 104. In an example, the controller 236 can take the form of a computing device with a processor, memory, program instructions (e.g., software code) stored in the memory, and a user interface (e.g., keyboard, display, etc.), although the controller 236 could take other forms in other examples. Although not explicitly shown in FIGS. 7A-7H, the controller 236 can have a wired or wireless connection to the vacuum source 232 so that the controller 236 can control the vacuum source 232 to engage or disengage vacuum suction. Alternatively, the vacuum source 232 can be manually operated.

Figure 7B:
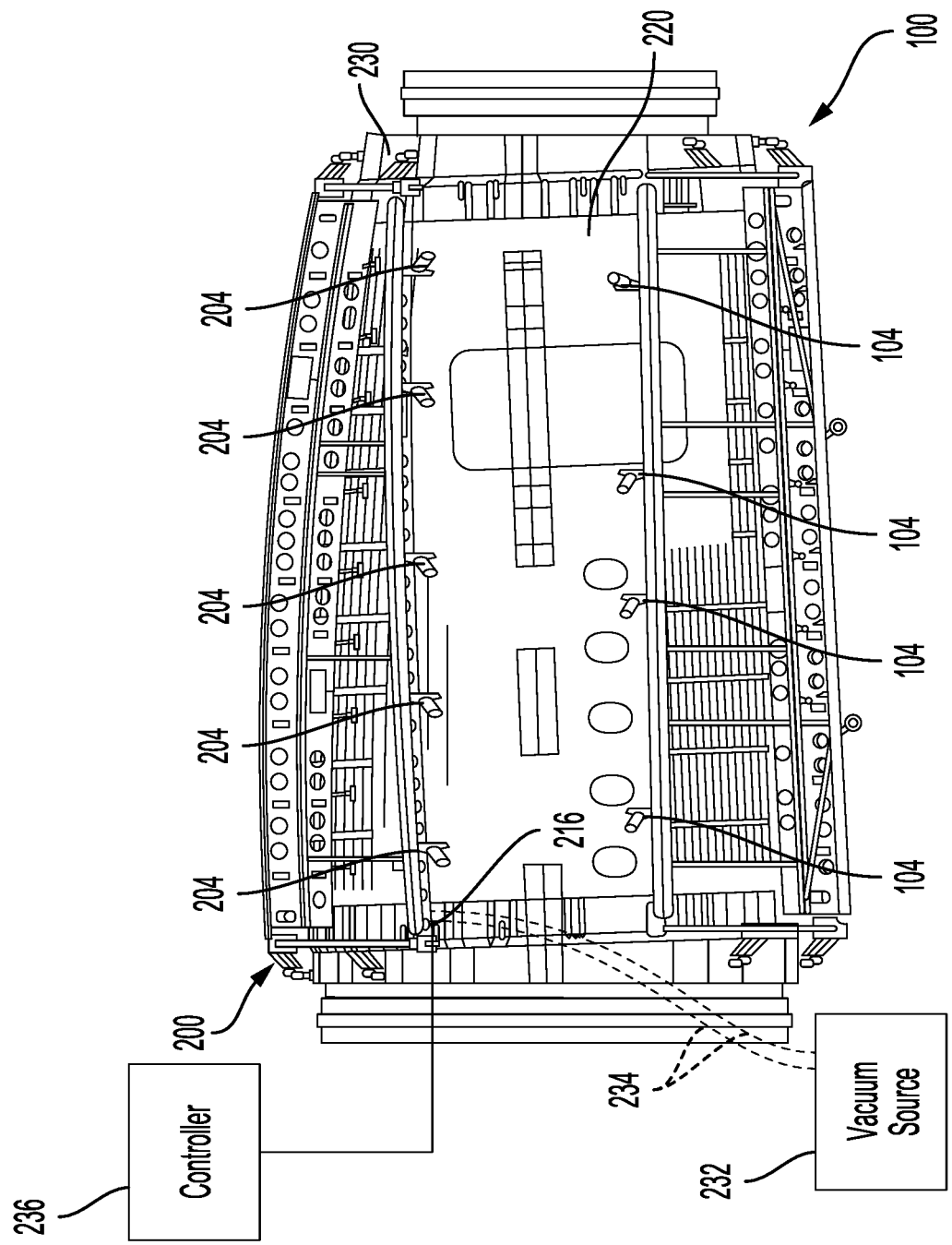

FIG. 7B illustrates a next stage in the process in which the second tubular structure 230 and the first tubular structure 220 are rotated approximately 180 degrees and the same process described above with respect to FIG. 7A is repeated to position the second strongback apparatus 200 on the first tubular structure 220 and engage the second plurality of vacuum cups 214 (not explicitly denoted in FIGS. 7A-7H) with the first tubular structure 220.

In some examples, a plurality of straps (not shown) could be attached between the strongback apparatus 100 and the second strongback apparatus 200 to provide additional security, keep the strongback apparatuses in position, and keep the first tubular structure 220 in place during trimming and bisection.

Figure 7C:
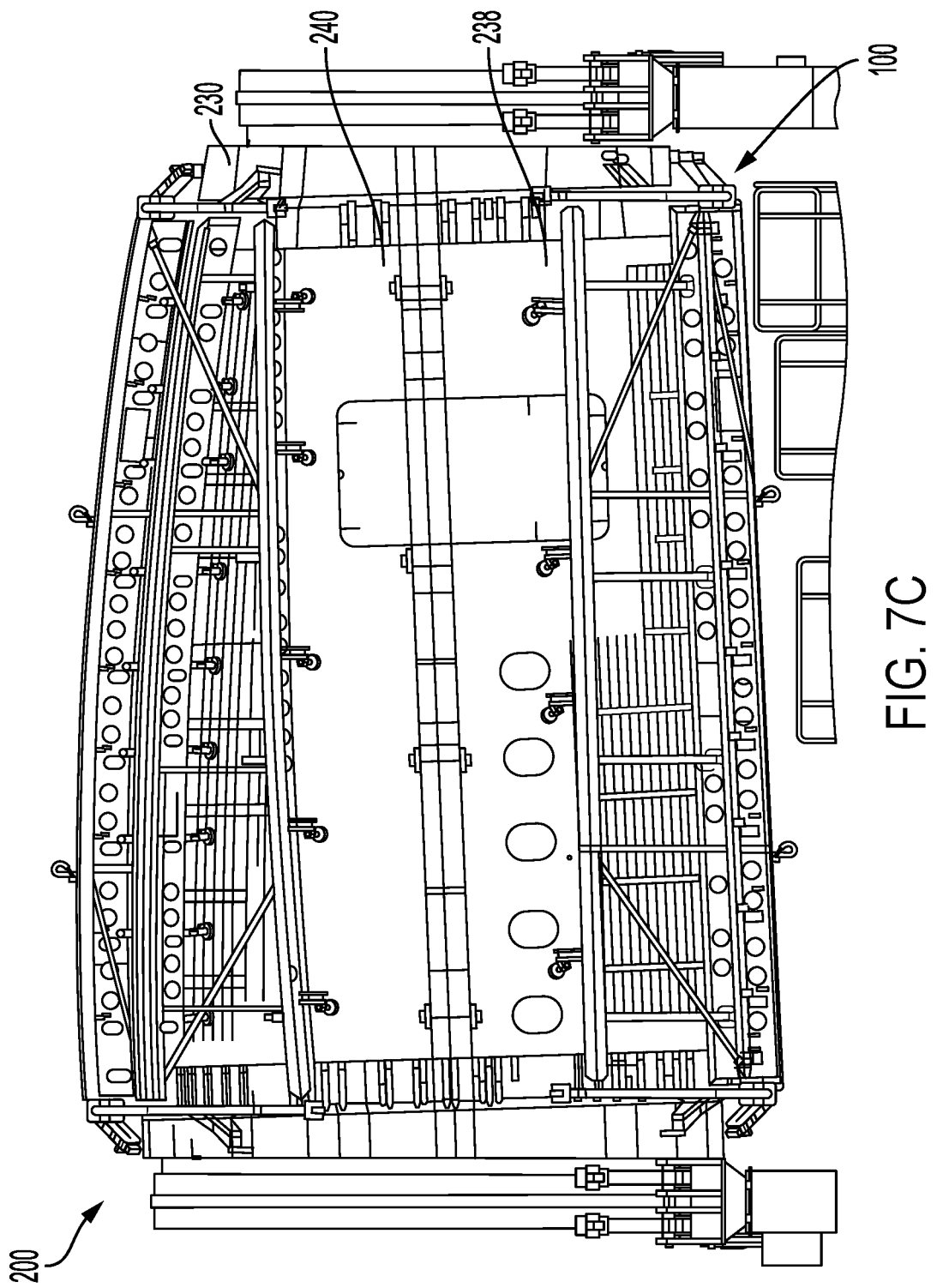
Figure 7D:
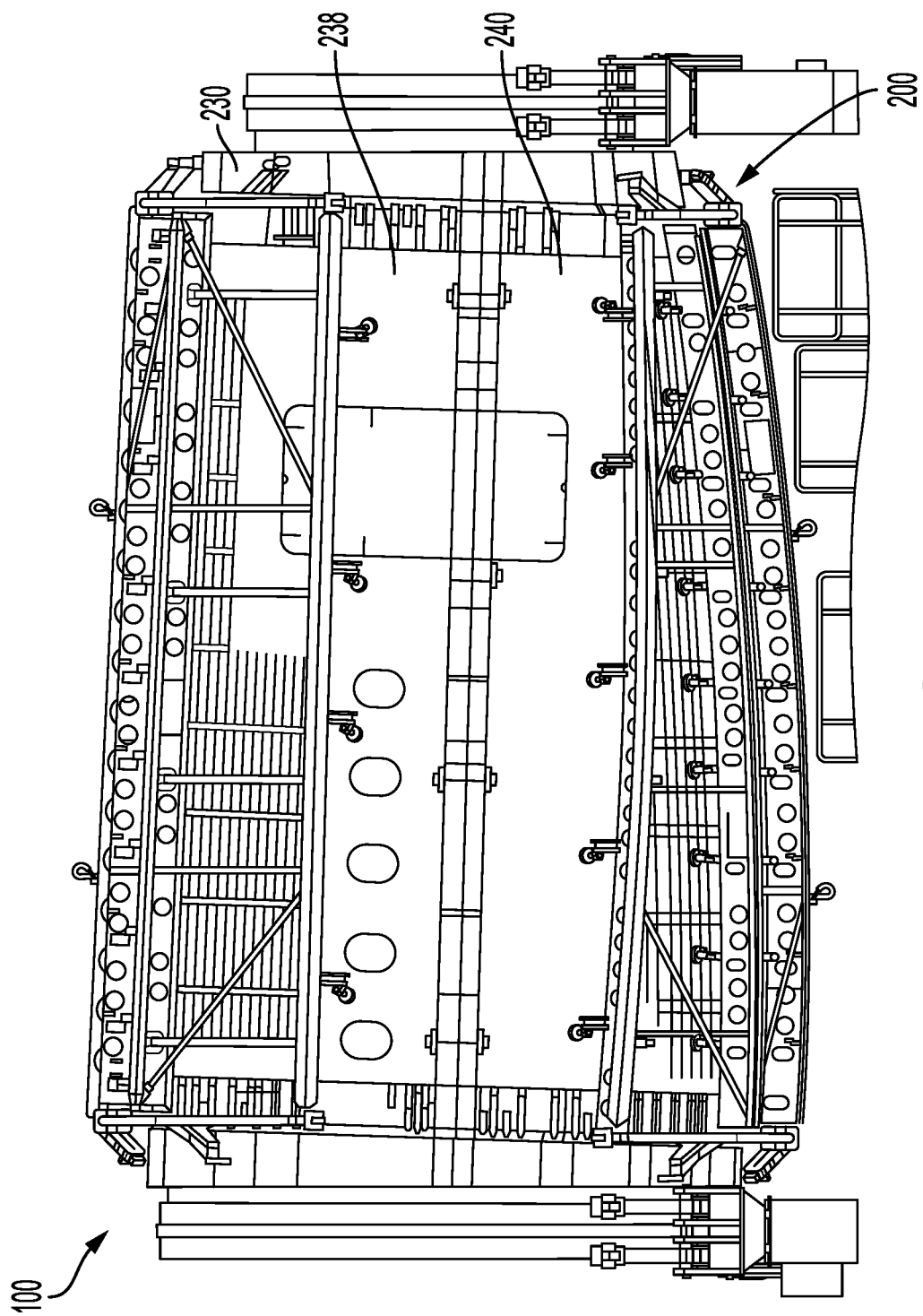

FIGS. 7C-7D illustrate next stages in the process during which the first tubular structure 220 is trimmed to create holes (e.g., for windows and doors of the fuselage) and longitudinally bisected into a first section 238 and a second section 240. In some examples, the bisection can result in the first tubular structure 220 being cut into substantially equal halves, although in other examples the first section 238 and the second section 240 might not be equal in size.

In particular, FIG. 7C illustrates a next stage in the process in which the first tubular structure 220 is trimmed and one side of the first tubular structure 220 is bisected.

FIG. 7D illustrates a next stage in the process in which the second tubular structure 230 and the first tubular structure 220 are rotated approximately 180 degrees, the first tubular structure 220 is trimmed, and the other side of the first tubular structure 220 is bisected, thereby completing the longitudinal bisection into the first section 238 and the second section 240. After the bisection is complete, the first section 238 and the second section 240 remain coupled to the second tubular structure 230.

Figure 7E:
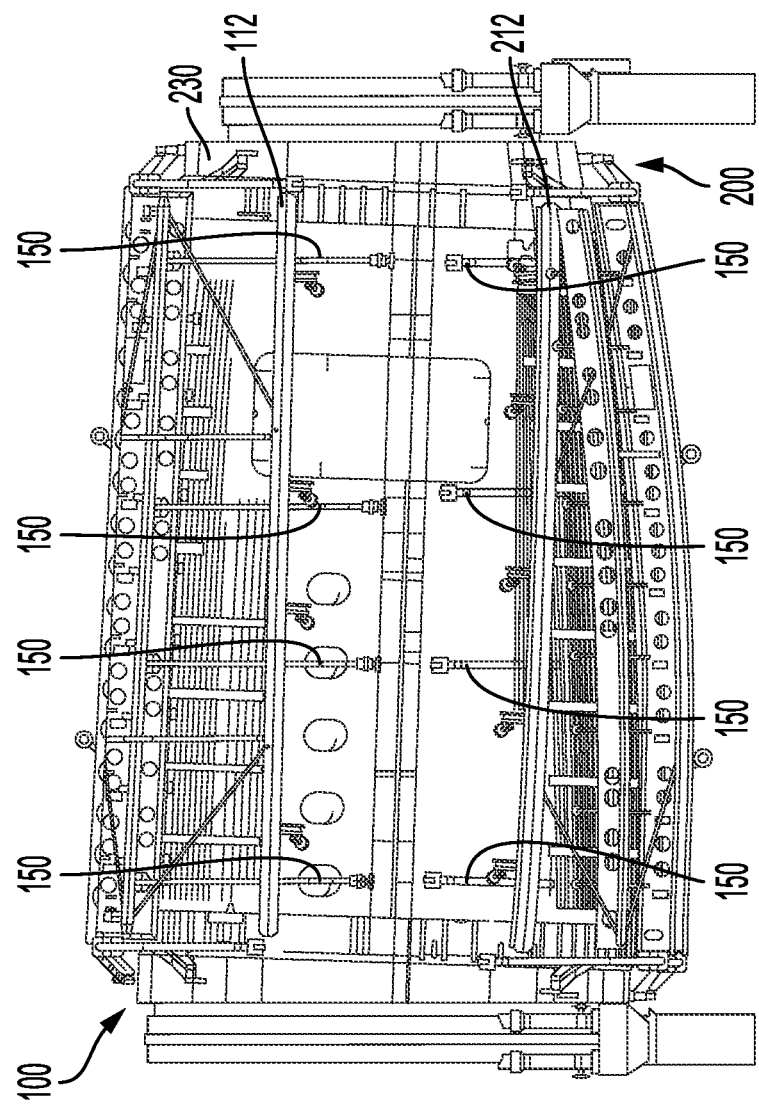
Figure 7F:
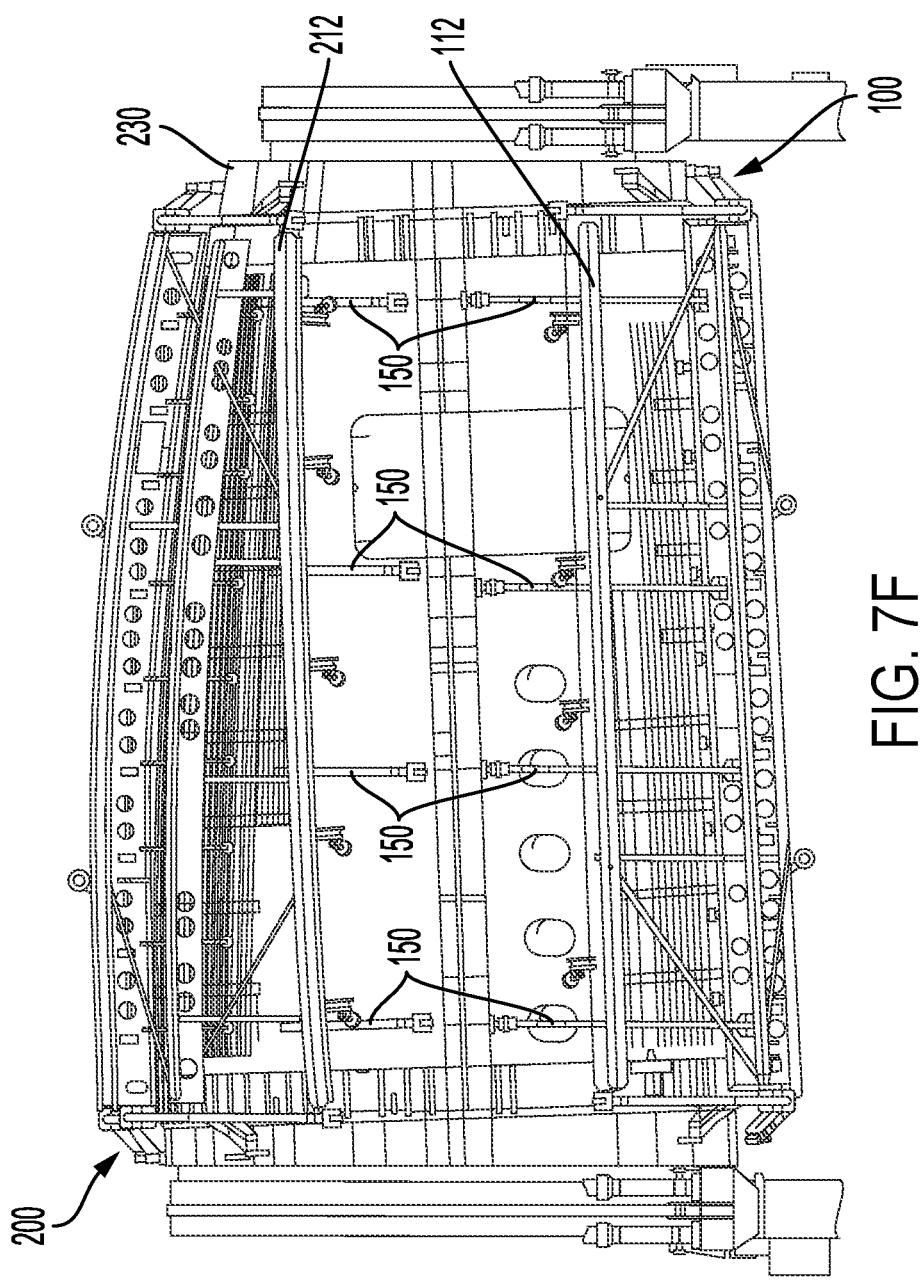

FIG. 7E and FIG. 7F illustrates next stages in the process in which the plurality of spreader arms 150 are attached to the pair of peripheral elongated members 112 and the second pair of peripheral elongated members 212. The proximal end of each spreader arm of the plurality of spreader arms 150 can be attached to a respective one of the pair of peripheral elongated members 112 or the second pair of peripheral elongated members 212 as described above with respect to FIG. 4.

FIG. 7G illustrates a next stage in the process in which the vacuum source 232 is operated to engage the vacuum suction cups of the plurality of actuators 104 and the second vacuum suction cups of the second plurality of actuators 204 with the first tubular structure 220. More particularly, the second vacuum suction cups of the second plurality of actuators 204 engage with the second section 240 and the plurality of actuators 104 engage with the first section 238.

To facilitate this, for example, the controller 236 controls each actuator of the second plurality of actuators 204 to move from the retracted position to the extended position to attach, via vacuum suction, to the second section 240. The controller 236 also controls each actuator of the plurality of actuators 104 to move from the retracted position to the extended position to attach, via vacuum suction, to the first section 238.

While the vacuum suction cups of the plurality of actuators 104 and the second vacuum suction cups of the second plurality of actuators 204 are engaged with the first section 238 and the second section 240, respectively, the controller 236 (i) controls the plurality of actuators 104 to pull the first section 238 of the first tubular structure 220 away from the second tubular structure 230 in the radially outward direction and (ii) controls the second plurality of actuators 204 to pull the second section 240 of the first tubular structure 220 away from the second tubular structure 230 in the radially outward direction. As such, as each actuator moves from the extended position to the retracted position, the vacuum suction cup of that actuator pulls the respective section of the first tubular structure 220 away from the second tubular structure 230.

In some examples, the controller 236 and the plurality of actuators 104 are configured such that the plurality of actuators 104 are controlled to synchronously pull the first section 238 away from the second tubular structure 230 in the radially outward direction. Likewise, the controller 236 and the second plurality of actuators 204 are configured such that the second plurality of actuators 204 are controlled to synchronously pull the second section 240 away from the second tubular structure 230 in the radially outward direction. Pulling synchronously in this manner can help avoid any damage to the first tubular structure 220.

In addition, while pulling the first section 238 and the second section 240 of the first tubular structure 220 away from the second tubular structure 230, the plurality of winch straps 152 (not explicitly denoted in FIGS. 7G-7H) are attached between the plurality of spreader arms 150 and the first section 238 and the second section 240, such as in the manner described above with respect to FIG. 5. The winches (not explicitly denoted in FIGS. 7G-7H) of the plurality of spreader arms 150 are then operated to tighten the plurality of winch straps 152, thereby pulling the first section 238 and the second section 240 away from the second tubular structure 230 (or, more particularly, pulling the first section 238 and the second section 240 farther away from the second tubular structure 230). This additional pulling facilitated by the plurality of spreader arms 150 and the plurality of winch straps 152 can help ensure that each section of the first tubular structure is spread far enough from the second tubular structure 230, such that each section does not get caught on the second tubular structure 230 or is otherwise not damaged when decoupled from the second tubular structure 230.

While pulling the second section 240 of the first tubular structure 220 away from the second tubular structure 230 with the second plurality of actuators 204 and the plurality of winch straps 152, the second section 240 is decoupled from the second tubular structure 230 with the second strongback apparatus 200. For example, the overhead crane is attached onto the second strongback apparatus 200 and lifts the second section 240 off the second tubular structure 230.

Figure 7H:
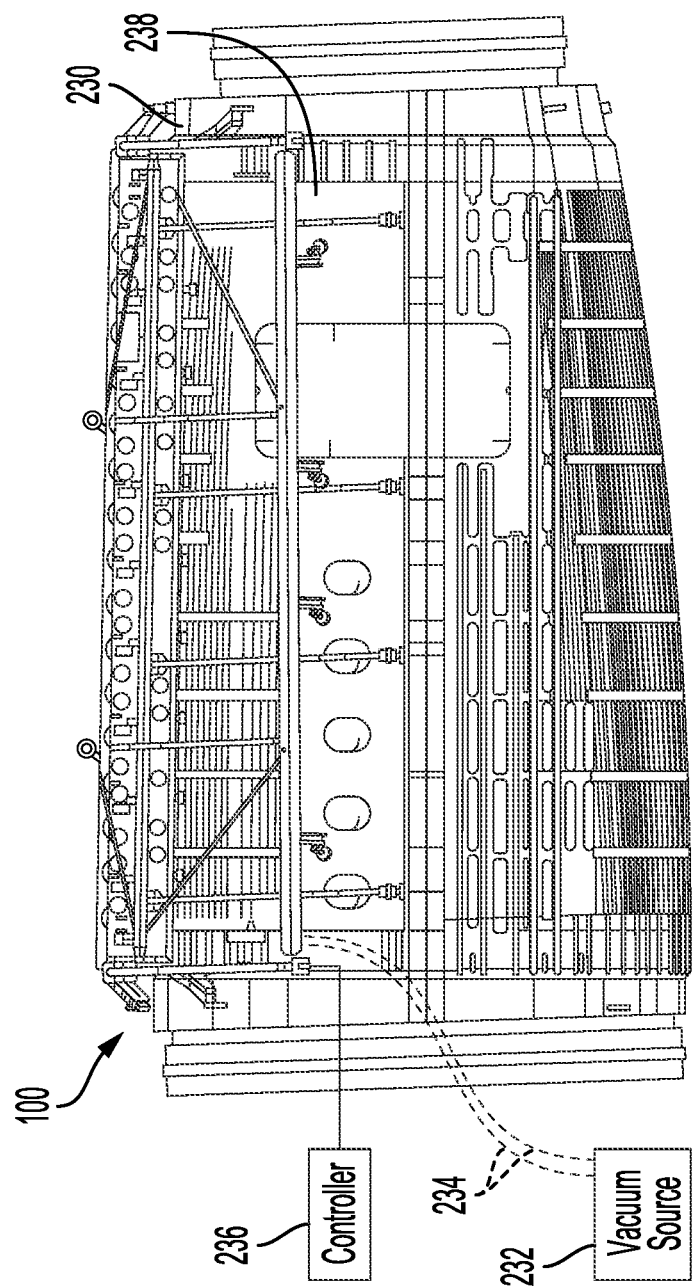

FIG. 7H illustrates a next stage in the process in which the second tubular structure 230 is again rotated approximately 180 degrees and, while pulling the first section 238 of the first tubular structure 220 away from the second tubular structure 230 with the plurality of actuators 104 and the plurality of winch straps 152, the first section 238 is decoupled from the second tubular structure 230 with the strongback apparatus 100. For example, the overhead crane is attached onto the strongback apparatus 100 and lifts the first section 238 off the second tubular structure 230.

Figure 8A:
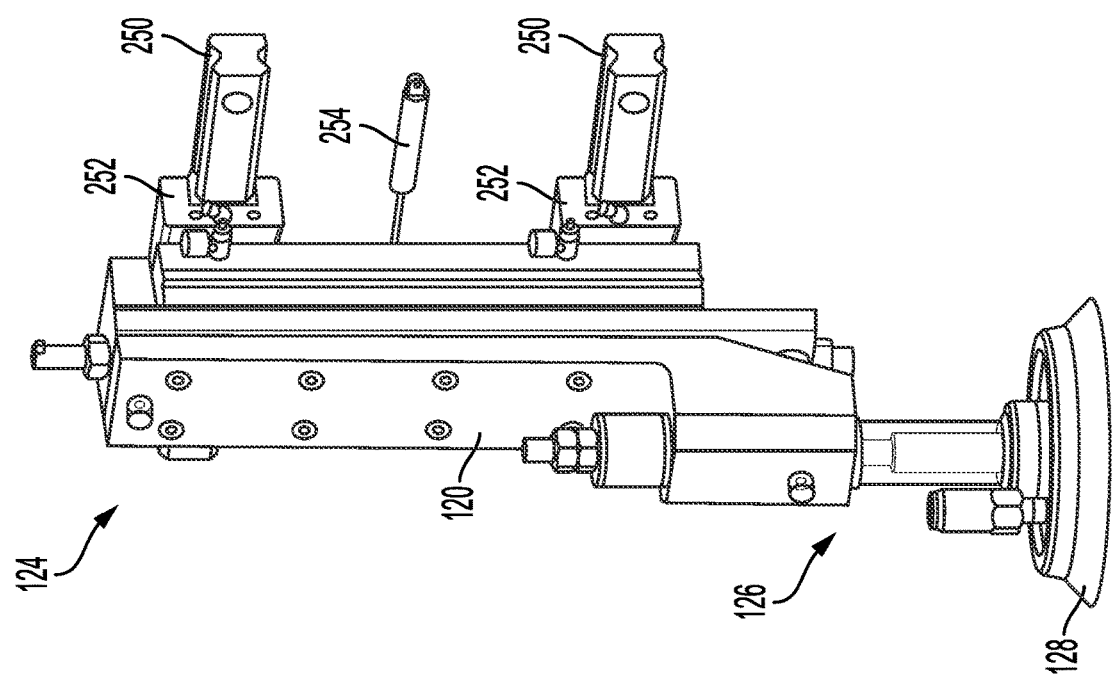
FIGS. 8A-8B illustrate perspective views of an example of an alternative way in which actuators can be coupled to the strongback apparatuses of FIGS. 1 and 6, according to an example implementation.
Figure 8B:
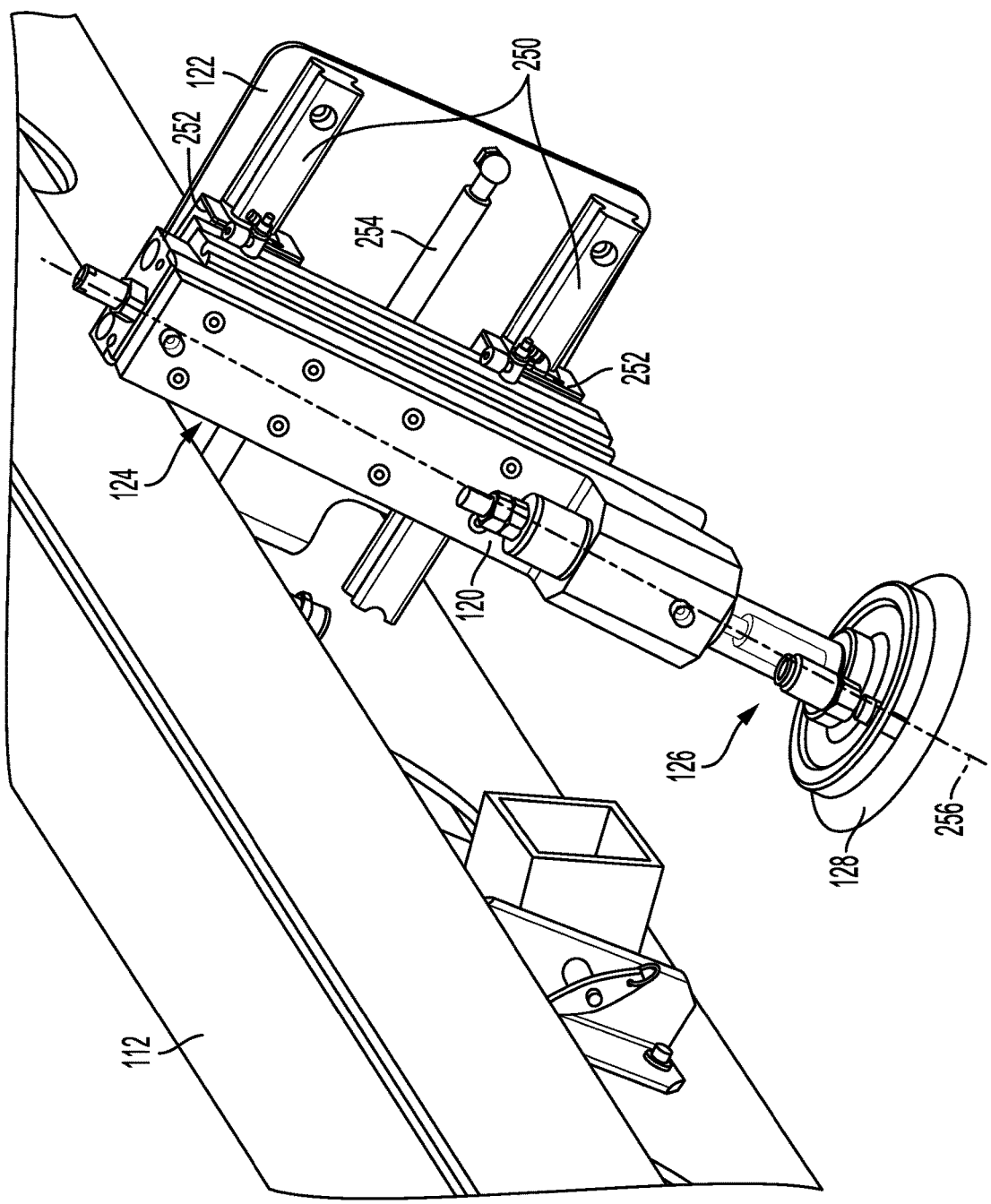

FIGS. 8A-8B depict an example of an alternative way in which actuators can be coupled to the strongback apparatuses described herein.

FIG. 8A depicts actuator 120 where the proximal end 124 is mounted to, and slidable along in the radially outward direction, linear rails 250. Although not explicitly shown in FIG. 8, the linear rails 250 can be coupled to the plurality of elongated members 110, such as to the pair of peripheral elongated members 112. Other components of actuator 120 are shown as well, including a rail bearing 252 and a spring 254 (e.g., a mechanical or gas spring). The rail bearing 252 and the spring 254 are configured to keep actuator 120 in a neutral position on the linear rails 250 (e.g., in the middle of the linear rails 250), but to still allow actuator 120 to float/move along the linear rails 250. This can allow actuator 120 to reduce shear loading of the vacuum suction cup 128 or compression/tension of the first tubular structure (not shown) during one or more of the processes described herein.

FIG. 8B depicts actuator 120 (as depicted in FIG. 8A) mounted to bracket 122. In particular, the linear rails 250 are mounted to bracket 122 substantially perpendicular to the actuator 120. In doing so, the linear rails 250 would also be approximately tangential to an exterior surface of the first tubular structure (not shown) and substantially perpendicular to a longitudinal axis 256 of actuator 120. Further, the longitudinal axis 256 of actuator 120 is substantially perpendicular to the exterior surface of the first tubular structure (not shown) to permit alleviation of shear loading as the first tubular structure is spread and removed from the second tubular structure. In some examples, spring 254 or a similar mechanism can be utilized to provide opposing forces to retain actuator 120 in a neutral position.

Figure 9:
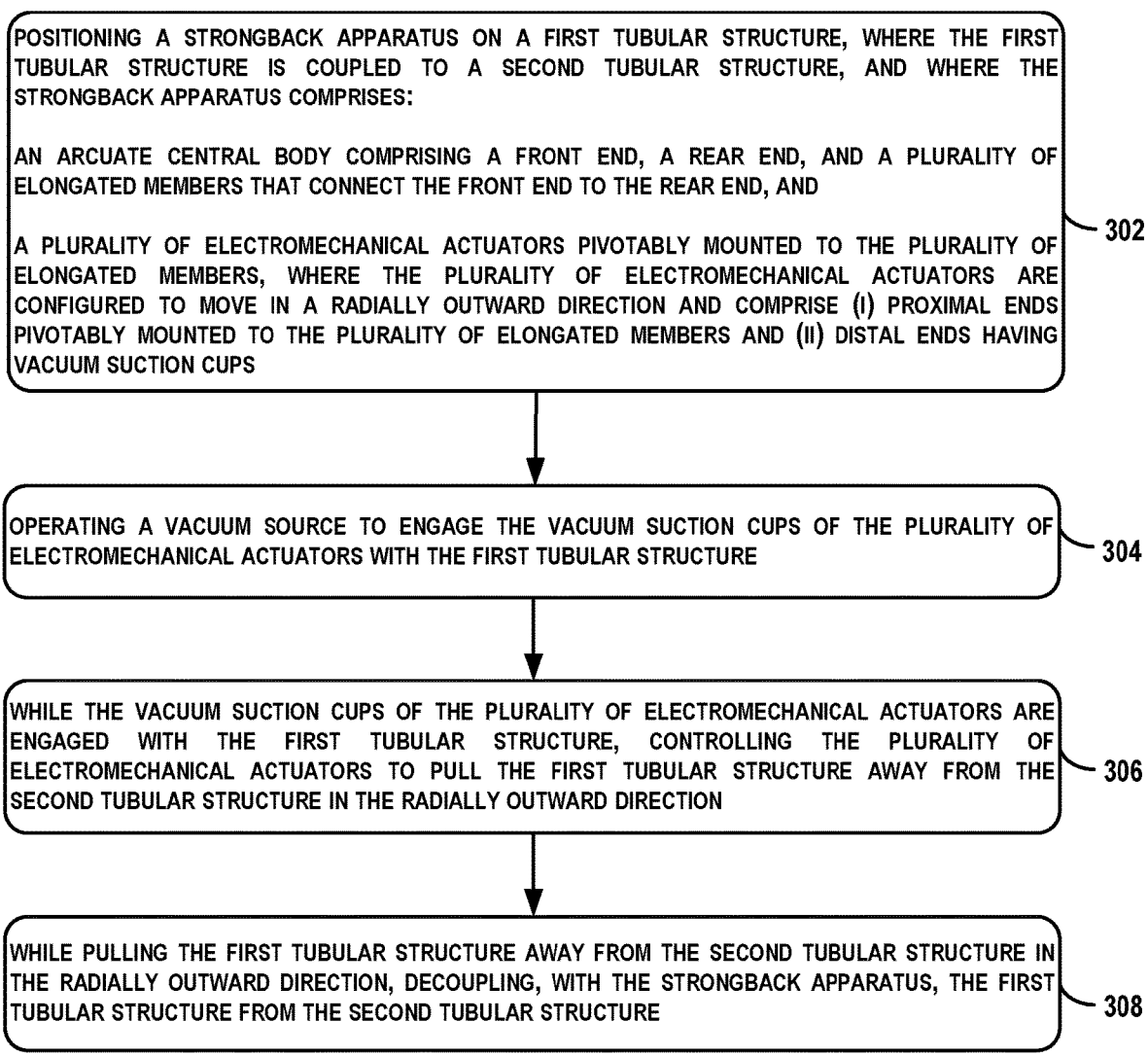
FIG. 9 shows a flowchart of an example method, according to an example implementation.

FIG. 9 shows a flowchart of an example of a method 300 that could be used with the strongback apparatus 100 shown in FIG. 1. Method 300 may include one or more operations, functions, or actions as illustrated by one or more of blocks 302-308.

At block 302, the method 300 includes positioning a strongback apparatus on a first tubular structure, where the first tubular structure is coupled to a second tubular structure, and wherein the strongback apparatus comprises: an arcuate central body comprising a front end, a rear end, and a plurality of elongated members that connect the front end to the rear end, and a plurality of actuators pivotably mounted to the plurality of elongated members, wherein the plurality of actuators are configured to move in a radially outward direction and comprise (i) proximal ends pivotably mounted to the plurality of elongated members and (ii) distal ends having vacuum suction cups.

At block 304, the method 300 includes operating a vacuum source to engage the vacuum suction cups of the plurality of actuators with the first tubular structure.

At block 306, the method 300 includes while the vacuum suction cups of the plurality of actuators are engaged with the first tubular structure, controlling the plurality of actuators to pull the first tubular structure away from the second tubular structure in the radially outward direction.

At block 308, the method 300 includes while pulling the first tubular structure away from the second tubular structure in the radially outward direction, decoupling, with the strongback apparatus, the first tubular structure from the second tubular structure.

Within examples, the positioning of block 302 is performed by positioning the strongback apparatus on a caul plate that is coupled to a fuselage, and the decoupling of block 308 is performed by decoupling, with the strongback apparatus, the caul plate from the fuselage.

Within examples, the positioning of block 302 is performed by positioning the strongback apparatus on a fuselage that is coupled to a one-piece mandrel, and the decoupling of block 308 is performed by decoupling, with the strongback apparatus, the fuselage from the one-piece mandrel.

Within examples, the controlling of block 306 is performed by controlling the plurality of actuators to synchronously pull the first tubular structure away from the second tubular structure in the radially outward direction.

The method 300 could also involve the second strongback apparatus 200 shown in FIG. 6. Within examples, the method 300 also includes positioning a second strongback apparatus on the first tubular structure, where the second strongback apparatus comprises: a second arcuate central body comprising a second front end, a second rear end, and a second plurality of elongated members that connect the second front end to the second rear end, and a second plurality of actuators pivotably mounted to the second plurality of elongated members, wherein the second plurality of actuators are configured to move in a radially outward direction and comprise (i) second proximal ends pivotably mounted to the second plurality of elongated members and (ii) second distal ends having second vacuum suction cups.

Within examples, the method 300 also includes after positioning the second strongback apparatus on the first tubular structure, longitudinally bisecting the first tubular structure into a first section and a second section, wherein the first section and the second section thereafter remain coupled to the second tubular structure.

Within examples, the controlling of block 306 is performed after longitudinally bisecting the first tubular structure into the first section and the second section and comprises controlling the plurality of actuators to pull the first section of the first tubular structure away from the second tubular structure in the radially outward direction. In such examples, the method 300 also includes operating the vacuum source to engage the second vacuum suction cups of the second plurality of actuators with the second section of the first tubular structure, and, while the second vacuum suction cups of the second plurality of actuators are engaged with the second section of the first tubular structure, controlling the second plurality of actuators to pull the second section of the first tubular structure away from the second tubular structure in the radially outward direction.

Within examples, the plurality of elongated members comprises a pair of peripheral elongated members that define longitudinal edges of the arcuate central body, and the second plurality of elongated members comprises a second pair of peripheral elongated members that define longitudinal edges of the second arcuate central body. In such examples, the method 300 also includes attaching a plurality of spreader arms to the pair of peripheral elongated members and the second pair of peripheral elongated members, where the plurality of spreader arms comprise (i) proximal ends removably attached to the pair of peripheral elongated members and the second pair of peripheral elongated members and (ii) distal ends having winches and, while pulling the first section and the second section of the first tubular structure away from the second tubular structure in the radially outward direction: attaching a plurality of winch straps between the plurality of spreader arms and the first tubular structure, where the plurality of winch straps comprise (i) first ends attached to the winches and (ii) second ends having clips attached to the first tubular structure, and operating the winches to tighten the plurality of winch straps, thereby pulling the first tubular structure farther away from the second tubular structure.

Within examples, the method 300 also includes while pulling the second section of the first tubular structure away from the second tubular structure with the second plurality of actuators and the plurality of winch straps, decoupling, with the second strongback apparatus, the second section of the first tubular structure from the second tubular structure. In such examples, the decoupling of block 308 is performed by decoupling, with the strongback apparatus, the first section of the tubular structure from the second tubular structure while pulling the first tubular structure away from the second tubular structure with the plurality of actuators and the plurality of winch straps.

Devices or systems may be used or configured to perform logical functions presented in FIG. 9. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Although blocks in FIG. 9, are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for these and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 9 may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A strongback apparatus comprising:
   an arcuate central body comprising a front end, a rear end, and a plurality of elongated members that connect the front end to the rear end, wherein the plurality of elongated members comprise a pair of peripheral elongated members that define longitudinal edges of the arcuate central body;
   a plurality of actuators pivotably mounted to the plurality of elongated members;
   a plurality of spreader arms removably attached to the pair of peripheral elongated members, wherein the plurality of spreader arms comprise distal ends having winches; and
   a plurality of winch straps comprising first ends that are attachable to the winches of the plurality of spreader arms,
   wherein the plurality of actuators are configured to move in a radially outward direction and comprise (i) proximal ends pivotably mounted to the plurality of elongated members and (ii) distal ends having vacuum suction cups.

2. The strongback apparatus of claim 1,
   wherein the plurality of actuators are pivotably mounted to the pair of peripheral elongated members.

3. The strongback apparatus of claim 2,
   wherein the plurality of spreader arms further comprise proximal ends that are removably attached to the pair of peripheral elongated members, and
   wherein the plurality of winch straps further comprise second ends having clips.

4. The strongback apparatus of claim 1, further comprising:
   a plurality of brackets fastened to the plurality of elongated members,
   wherein the proximal ends of the plurality of actuators are pivotably mounted to the plurality of brackets.

5. The strongback apparatus of claim 4, wherein the proximal ends of the plurality of actuators comprise one or more detent pins, and
   wherein the plurality of brackets comprise one or more detent holes configured for receiving the one or more detent pins of the proximal ends of the plurality of actuators.

6. The strongback apparatus of claim 1, further comprising:
a plurality of vacuum cups fixedly mounted to the plurality of elongated members.

7. The strongback apparatus of claim 1, wherein the vacuum suction cups of the plurality of actuators are configured to be coupled to a vacuum source.

8. The strongback apparatus of claim 1, wherein the plurality of actuators are configured to move in the radially outward direction from an extended position to a retracted position,
wherein in the extended position, the vacuum suction cups engage a fuselage on which the strongback apparatus is positioned, and
wherein, as the plurality of actuators move from the extended position to the retracted position, the vacuum suction cups pull the fuselage away from a one-piece mandrel to which the fuselage is coupled.

9. The strongback apparatus of claim 1, wherein the plurality of actuators comprises one or more electromechanical actuators.

10. The strongback apparatus of claim 9, wherein the plurality of actuators further comprises one or more pneumatic actuators.

11. The strongback apparatus of claim 1, further comprising:
a socket for coupling to a controller such that the controller is able to electronically control the plurality of actuators.

12. A system comprising:
a one-piece mandrel;
a fuselage coupled to the one-piece mandrel; and
a strongback apparatus positioned on the fuselage, the strongback apparatus comprising:
an arcuate central body comprising a front end, a rear end, and a plurality of elongated members that connect the front end to the rear end, and
a plurality of actuators mounted to the plurality of elongated members,
wherein the plurality of actuators are configured to move in a radially outward direction from extended positions to retracted positions and comprise (i) proximal ends mounted to the plurality of elongated members and (ii) distal ends having vacuum suction cups,
wherein in the extended positions, the vacuum suction cups engage the fuselage on which the strongback apparatus is positioned, and
wherein, as the plurality of actuators moves from the extended positions to the retracted positions, the vacuum suction cups pull the fuselage away from the one-piece mandrel.

13. The system of claim 12, wherein proximal ends of the plurality of actuators are pivotably mounted to the plurality of elongated members.

14. The system of claim 12, wherein the proximal ends of the plurality of actuators are mounted to, and slidable along in the radially outward direction, linear rails coupled to the plurality of elongated members.

15. The system of claim 12, wherein the plurality of actuators comprises one or more electromechanical actuators.

16. The system of claim 15, wherein the plurality of actuators further comprises one or more pneumatic actuators.

17. The system of claim 12, wherein the vacuum suction cups of the plurality of actuators are configured to be coupled to a vacuum source.

18. The system of claim 12, wherein the vacuum suction cups comprises thirty-six vacuum cups.

19. The system of claim 12, wherein the strongback apparatus includes four ports.

20. The system of claim 12, further comprising:
a second strongback apparatus positioned on the fuselage, wherein the strongback apparatus and the second strongback apparatus enable a longitudinal bisection of the fuselage into a first section and a second section.

* * * * *